US012634018B2

(12) United States Patent
Bay et al.

(10) Patent No.: US 12,634,018 B2
(45) Date of Patent: May 19, 2026

(54) SIGNAL TRANSMISSION SYSTEM FOR TRANSMITTING A MAIN PROCESS VARIABLE AND FURTHER DATA BETWEEN A FIELD DEVICE AND A SUPERORDINATE UNIT, AND A CORRESPONDING METHOD

(71) Applicant: Turck Holding GmbH, Halver (DE)

(72) Inventors: Arthur Bay, Herscheid (DE); Matthias Seifert, Dortmund (DE); Falko Visser, Moers (DE); Stefan Pumpe, Schwelm (DE); Klaus Schallenberg, Cologne (DE); Hans-Christian Weinert, Witten (DE)

(73) Assignee: Turck Holding GmbH, Halver (DE)

( * ) Notice: Subject to any disclaimer, the term of this patent is extended or adjusted under 35 U.S.C. 154(b) by 309 days.

(21) Appl. No.: 18/461,610

(22) Filed: Sep. 6, 2023

(65) Prior Publication Data

US 2024/0089012 A1     Mar. 14, 2024

(30) Foreign Application Priority Data

Sep. 13, 2022     (DE) ..................... 10 2022 123 352.9

(51) Int. Cl.
*H04B 10/80*          (2013.01)
*H04B 10/40*          (2013.01)
(Continued)

(52) U.S. Cl.
CPC ........... *H04B 10/802* (2013.01); *H04B 10/40* (2013.01); *H04B 10/50* (2013.01); *H04B 10/60* (2013.01); *H04L 27/0002* (2013.01)

(58) Field of Classification Search
None
See application file for complete search history.

(56) References Cited

U.S. PATENT DOCUMENTS 5,515,443 A * 5/1996 Meyer .................. H04R 25/556
381/314
2009/0303090 A1 12/2009 Korn et al.
(Continued)

FOREIGN PATENT DOCUMENTS

DE          10230216 A1     1/2004
DE     10 2006 055 396 A1     5/2008
(Continued)

OTHER PUBLICATIONS

Search Report issued in DE 10 2022 123 352.9, to which this application claims priority, mailed Nov. 20, 2023 (English-language machine translation attached).
(Continued)

*Primary Examiner* — Darren E Wolf
(74) *Attorney, Agent, or Firm* — Pearl Cohen Patentanwälte PartGmbB; Michael McCandlish

(57)          ABSTRACT

A signal transmission system for transmitting a main process variable and further data between a field device and a superordinate unit, includes a first conversion arrangement, a second conversion arrangement and an optocoupler arrangement. The optocoupler arrangement is connected between the first conversion arrangement and the second conversion arrangement. The first conversion arrangement is configured to convert at least the further data exchanged between the field device and the superordinate unit into a data signal transmittable via the optocoupler arrangement. The optocoupler arrangement transmits the data signal between the first conversion arrangement and the second conversion arrangement. The second conversion arrangement converts the data signal to the further data and transmits it to the field device. A method transmits a main process variable and further data between a field device and a (Continued)

superordinate unit. In the method, at least the further data is transmitted via an optocoupler arrangement.

14 Claims, 8 Drawing Sheets

(51) Int. Cl.
  H04B 10/50          (2013.01)
  H04B 10/60          (2013.01)
  H04L 27/00          (2006.01)

(56)                References Cited

U.S. PATENT DOCUMENTS

| | | | | |
|---|---|---|---|---|
| 2012/0020430 | A1* | 1/2012 | Haase | H03M 3/438 |
| | | | | 375/295 |
| 2012/0226458 | A1* | 9/2012 | Lavoie | H04L 1/205 |
| | | | | 702/69 |
| 2012/0308180 | A1* | 12/2012 | Tosetti | G02B 6/3878 |
| | | | | 385/27 |
| 2015/0082907 | A1 | 3/2015 | Hunter et al. | |
| 2018/0191539 | A1* | 7/2018 | Haran | H04L 1/00 |
| 2021/0227630 | A1* | 7/2021 | Hofmeister | H04W 88/16 |
| 2023/0123468 | A1 | 4/2023 | Schäuble et al. | |
| 2023/0297059 | A1 | 9/2023 | Schulte et al. | |
| 2024/0053728 | A1 | 2/2024 | Jung et al. | |

FOREIGN PATENT DOCUMENTS

| | | | |
|---|---|---|---|
| DE | 20 2015 004 127 | U1 | 8/2015 |
| DE | 102014009709 | A1 | 1/2016 |
| DE | 10 2020 105 605 | A1 | 9/2021 |
| DE | 102020122321 | A1 | 3/2022 |
| WO | 2021254677 | A1 | 12/2021 |

OTHER PUBLICATIONS

European Search Report issued in 23 191 015.9, which is a counterpart hereof, mailed Feb. 23, 2024 (English-language machine translation attached).

* cited by examiner

SIGNAL TRANSMISSION SYSTEM FOR TRANSMITTING A MAIN PROCESS VARIABLE AND FURTHER DATA BETWEEN A FIELD DEVICE AND A SUPERORDINATE UNIT, AND A CORRESPONDING METHOD

CROSS REFERENCE TO RELATED APPLICATIONS

This application claims priority to German patent application DE 10 2022 123 352.9 filed on Sep. 13, 2022, which is hereby incorporated by reference in its entirety.

TECHNICAL FIELD

The present disclosure relates to the field of process automation technology. Within this technology, field devices can be used which are connected to a superordinate unit. Such field devices are generally used to record and/or influence process variables. Such field devices are generally known.

BACKGROUND

The signal transmission between the field devices and the superordinate unit often follows the 4-20 mA standard. For example, the measured values from sensors, which are an example of field devices, are transmitted to the superordinate unit as a 4-20 mA current signal via a two-wire process control loop. In any case, the transmission of the main process variables in the prior art takes place in an analog manner via the 4-20 mA standard.

Usually also digital signals are transmitted via this two-wire process control loop in accordance with the so-called HART standard (Highway Addressable Remote Transducer—HART signals). For example, the other data for communication which are not the measured or control values (main process variables), are thus transmitted via the so-called HART protocol. These other data are hereinafter referred to as "further data". According to the HART protocol, data transmission is switched between 1,200 Hz and 2,200 Hz, with a logical 1 for the lower frequency and a logical 0 for the higher frequency.

In this way, the analog current signal which changes only slowly remains unaffected by the frequency superposition, so that analog and digital communication are combined in this configuration.

Relevant prior art in this field is described in DE 10 2020 105 605 A1, DE 10 2006 055 396 A1 and DE 20 2015 004 127 U1.

In the state of the art, there are various solutions for transmitting the HART signal between a field device and a superordinate unit. Usually, a master and at least one slave device are provided.

For example, the HART signal may be transmitted via a transformer. In order to galvanically isolate the field device side from the side of the superordinate unit, the HART signal is decoupled via a controller connected in series by means of a HART transformer and again coupled in on the other side via the secondary winding of the HART transformer.

The galvanic isolation is completely maintained and the communication works in both directions, i.e., from the master to the slave and from the slave to the master. This solution has a high space requirement.

SUMMARY

To solve the problem described above, the present disclosure proposes a signal transmission system having the features of an independent claim. This is characterized in particular by the use of an optocoupler arrangement for transmitting the data signal.

The signal transmission system for transmitting a main process variable and further data between a field device and a superordinate unit comprises a first conversion arrangement, a second conversion arrangement and an optocoupler arrangement. The optocoupler arrangement is connected between the first conversion arrangement and the second conversion arrangement. The first conversion arrangement is configured to convert at least the further data exchanged between the field device and the superordinate unit into a data signal such that they (the further data) are transmittable via the optocoupler arrangement. The optocoupler arrangement is configured to transmit the data signal between the first conversion arrangement and the second conversion arrangement. The second conversion arrangement is configured to convert the data signal to the further data exchanged between the field device and the superordinate unit and to transmit the further data to the field device.

In other words, a main process variable, such as measured values and control values, as well as further data (for example communication data) are exchanged between a field device and a superordinate unit. Here, at least these further data are first converted in a first conversion arrangement so that a data signal is generated which can be used as in input into an optocoupler arrangement. In this optocoupler arrangement, the signal is then transmitted optically in a digital form. In a second conversion arrangement, this data signal transmitted via the optocoupler arrangement is then again reconverted.

The use of such optocoupler arrangements replaces in particular the previously described transmission path by means of a HART transformer. In this way, galvanic isolation can be achieved while still providing high measurement accuracy.

An optocoupler, also called optoisolator, is a semiconductor device. It uses a short optical transmission path to transmit an electrical signal between circuits or elements of a circuit. Electrically the two elements are isolated from each other, i.e., galvanically separated.

Such an optocoupler usually comprises a light-emitting diode or laser diode as the optical sender and a photodiode or phototransistor as the optical receiver. The sender and receiver are optically coupled to each other in a housing that is opaque from the outside.

In the signal transmission system provided between the corresponding field device and the superordinate unit, an optocoupler arrangement is integrated. This optocoupler arrangement is provided between a first conversion arrangement and a second conversion arrangement in which the respective signals from the field device or the superordinate unit may be converted.

According to a further example of the disclosure, the further data comprise field device input data. The field device input data are data that are sent from the superordinate unit to the field device. Additionally or alternatively, the further data may be field device output data transmitted from the field device to the superordinate unit.

The further data are in particular data via which the communication between the superordinate unit and the field devices takes place.

These further data can be field device input data and/or field device output data. These data are exchanged in different directions between the field device and the superordinate unit or between the superordinate unit and the field device. These data may be transmitted in the optocoupler arrangement and thus across the galvanic isolation in the signal transmission system.

It has turned out to be advantageous that the further data are transmitted in the HART standard. In particular, the transmission to the optocoupler arrangement or the output by the optocoupler arrangement is carried out by means of the HART standard. The HART standard is generally known for process technology. The HART standard and the corresponding specifications are incorporated by this reference into the disclosure of the present application. The HART data are digital data that are then transmittable in the optocoupler arrangement galvanically isolated between a part of the signal transmission system associated with the field device and a part of the signal transmission system associated with the superordinate unit.

In particular, the superordinate unit is operated as a HART master device. Furthermore, in particular the field device is operated as a HART slave device. Accordingly, the disclosure enables communication both from master to slave and vice versa from slave to master.

During communication according to the HART standard, particularly request telegrams are transmitted from the master to the slave and response telegrams from the slave to the master.

According to an advantageous further development of the disclosure, the first conversion arrangement comprises a first HART modem. This first HART modem is configured to receive a field device input signal from the field device and to filter out a so-called HART data part from the field device input signal. This field device input signal is in particular the signal which comprises the main process variables and the further data, in the present case the further data in the HART standard.

In the first HART modem, the filtered-out HART data part is routed as a data signal to the second conversion arrangement via the optocoupler arrangement.

In this further development, the second conversion arrangement comprises a second HART modem. There, the data signal (the HART data part converted in the first HART modem) is converted again to the further data in the HART standard. That is, the HART data input into the first HART modem at the beginning is then output by the HART modem on the side of the superordinate unit.

The second HART modem is configured to output the HART data part filtered out by the first HART modem after its conversion to the further data in the HART standard as a superordinate unit output signal which is output by the signal transmission system to the superordinate unit. That is, these further data in the HART standard can then be output in a superordinate unit output signal which is output from the signal transmission system to the superordinate unit.

This superordinate unit output signal (that is, the signal output from the signal transmission system to the superordinate unit) can then contain only the HART data part or can be merged again with the main process variables from the field device input signal.

The data flow direction from the first HART modem via the optocoupler to the second HART modem was described previously. Similarly, the data flow direction between the second HART modem and the first HART modem can also go in the other direction.

For this purpose, the second conversion arrangement comprises the second HART modem. This is configured to receive a superordinate unit input signal from the superordinate unit. This signal in the HART data part from the superordinate unit input signal to this superordinate unit input signal is in particular a signal which comes from the superordinate unit and which comprises the main process variables and further data in the HART standard.

The second HART modem filters out the HART data part from the received superordinate unit input signal. The second HART modem passes this filtered-out signal as a data signal via the optocoupler arrangement to the first conversion arrangement.

This data signal is forwarded via the optocoupler arrangement to the first conversion arrangement, where it is converted again in the first HART modem and the corresponding HART data part is then output in a field device output signal. This can contain only the HART data part or can be merged again with the main process variables.

Even if the data from main process variables and further data are presently merged between the field device and the signal transmission system and are split in the signal transmission system and merged again between the signal transmission system and the superordinate unit, this does not have to be the case. The corresponding data (main process variables and further data) can also be continued separated from each other (on one or both sides).

In any case, at least the further data are transmitted via the optocoupler.

The main process variables, which are transmitted by means of an analog signal, for example, do not have to be transmitted via such an optocoupler and are transmittable in any manner.

In another example, instead of the further data, only the main process variables can be transmitted by means of the optocoupler. This example can also be the subject matter of a separate disclosure.

According to an advantageous further development according to the disclosure, the respective conversion arrangement (first and second conversion arrangement, respectively) each has a respective signal processing unit. This signal processing unit is provided in each case between the corresponding HART modem and the optocoupler arrangement.

Thus, a first signal processing unit may be provided between the first HART modem and the field device side input of the optocoupler arrangement, and a second signal processing unit may be provided between the superordinate unit side of the optocoupler and the second HART modem. The signal processing unit converts the respective signals received from or sent to the HART modem into signals that are transmittable by means of the optocoupler arrangement.

Advantageously, the corresponding HART modem first converts the HART data part into a TTL (Transistor-to-Transistor Logic) signal and then transfers this to the signal processing unit. There, the TTL signal is converted into a signal suitable for optocouplers. At the same time, the corresponding signal processing unit also converts in each case a signal coming from the optocoupler arrangement into a corresponding TTL signal.

According to another advantageous example, the first HART modem taps the HART data part of the field device input signal received from the field device via a first capacitor arrangement. Likewise, the HART data part that has been transmitted via the optocoupler arrangement is also deliverable via this first capacitor arrangement to form the field device output signal.

The same configuration may additionally or alternatively include the second HART modem. The HART data part of the higher-level input unit signal, which is received coming from the superordinate unit, is tapped via a second capacitor arrangement. The HART data part coming from the optocoupler into the second HART modem is output via the second capacitor arrangement and forms the superordinate unit output signal.

According to an advantageous further development of the disclosure, the main process variables are transmitted between the field device and the superordinate unit essentially as an analog signal. In the signal transmission system area, this analog signal is convertable to a digital signal and then, after being transmitted via the signal transmission system, converted back to the analog signal.

However, it is also possible that an analog (main process variable) signal is introduced into the signal transmission system on one side and this is executed as a digital signal on the other side.

The modules described below can thus have corresponding inputs or outputs (connectors) where the lines for the digital or analog signal of the main process variables can be tapped directly. Thus, a variable connection can be achieved with the same signal transmission system.

In particular, the first conversion arrangement has an A/D converter by means of which the analog (main process variable) signal coming from field devices is converted into a digital main process variable signal. This digital main process variable signal is used within the signal transmission system and transmitted via the optocoupler arrangement.

The second conversion arrangement can have a corresponding D/A converter. By means of this, the digital main process variable signal used within the signal transmission systems is converted back into the analog signal.

The A/D converter is preferably provided in parallel with the first HART modem. The digital main process variable signals generated in the A/D converter are then transmitted to the signal processing unit of the first conversion arrangement. In parallel, the HART data part is also transmitted between the HART modem to the signal processing unit of the first conversion arrangement. From there, the processed digital main process variable signals and the processed HART data part are then transmitted between the signal processing unit of the first conversion arrangement and the optocoupler arrangement.

After passing through the optocoupler arrangement, a corresponding signal processing unit can additionally or alternatively be provided again in the second conversion arrangement. There, the corresponding processed digital main process variable signals and processed HART data parts are processed back to the HART data part and the digital main process variable signal, respectively, and then fed accordingly into the D/A converter and the second HART modem, respectively, which are again connected in parallel to each other.

The optocoupler arrangement can have two or more optocouplers (optocoupler units). Each optocoupler unit can have a light-emitting diode or laser diode as the optical transmitter and a photodiode or phototransistor as the optical receiver.

In one aspect, the optocoupler arrangement may comprise a HART data part transmission optocoupler for transmitting the HART data part processed in the signal processing unit. Additionally or alternatively, the optocoupler arrangement may have a main process variable transmission optocoupler for transmitting the main digital process variable processed in the signal processing unit.

Additionally or alternatively, the optocoupler arrangement may have a separate optocoupler for each direction of transmission between the field device and the superordinate unit, that is, one optocoupler is used for transmission from the superordinate unit to the field device and a different optocoupler is used for transmission between the field device and the superordinate unit.

As far as the HART data part and the main process variables are transmitted in two directions, four optocouplers are thus provided, for example.

According to an advantageous example, the processed HART data part and the processed digital main process variable are also transmittable via a single optocoupler. Thus, one optocoupler can be provided for both data aspects (HART data part and processing digital main processor variable).

For example, two or four optocoupler devices may be provided in the optocoupler arrangement.

As an alternative to the above example, in which the main process variables are transmitted in analog form between the field device and the signal transmission system or between the superordinate unit and the transmission system, the main process variables are also transmittable in digital form between the field device and the signal transmission system or between the superordinate unit and the transmission system.

For this purpose, there are already known field devices or higher-level transmission devices in the state of the art that can process such digital data.

In order to have a system that is as versatile as possible, the signal transmission system, for example, advantageously has inputs for each of the two situations that receive the corresponding main process variables in either analog or digital form.

It has turned out to be particularly advantageous that the signal transmission system is designed as a signal transmission unit which has a backplane in which corresponding independent modules are pluggable interchangeably. This backplane and these modules are constructed, for example, in a manner known per se. The corresponding lines for further data transmission, and transmission of the main process variables and also the voltage supply, respectively, are routed through the backplane.

The first conversion arrangement, second conversion arrangement and optocoupler arrangement described above can each be designed as an independent module. By inserting the corresponding modules into the corresponding slots, the corresponding connections for the corresponding data flow are established.

Each conversion arrangement may further be subdivided into one, two or more modules. For example, each of the first and/or second conversion arrangement may include a signal processing module and a transformation module. The signal processing module contains the signal processing functionality for signal processing into signals that are transmittable via the optocoupler arrangement. Accordingly, the transformation module contains the elements, such as the HART modem, in which the corresponding HART data are separated. In this transformation module a guidance of the main process variable signals and the corresponding further data takes place.

At least these modules can have different pin assignments. By connecting the backplane, the corresponding signals are then tappable at the plug connections provided on the backplane and routed to the corresponding field device or the superordinate unit.

In particular, the first conversion arrangement and the second conversion arrangement are galvanically isolated from each other.

The first conversion arrangement and the second conversion arrangement and additionally also the optocoupler device can be supplied with power via a common power supply.

The signal transmission system may be configured along the galvanic isolation in the direction of data transmission between the field devices of the superordinate unit in a substantially mirror-symmetrical manner in electrical terms. In particular, the system is configured as an intrinsically safe system.

Ex1 is a technical term for an area in which an explosive atmosphere consisting of a mixture of air with flammable substances in the form of gas, vapor or mist is likely to occur in normal operation. In particular, a system designed for intrinsically safe operation or for use in an Ex Zone 1 satisfies the legal requirements for equipment used in such an environment. In particular, "intrinsically safe" operation is provided, which excludes the development of sparks that could cause an explosion.

According to another subsidiary aspect of the disclosure, there is disclosed a method of transmitting a main process variable and further data between a field device and a superordinate unit. The method has the features of an independent claim.

The previously mentioned device features and individual aspects can also be used in procedural form for the corresponding process.

Even though it is described in an independent claim that at least the further data are transferable via the optocoupler device, the main process variables alone are also transferable via such optocoupler device.

Although an independent claim describes the first conversion arrangement and the second conversion arrangement, they are not essential to the disclosure.

An optocoupler arrangement for use in the above signal transmission system can also be put under protection, or the aforementioned modules for use and insertion in a backplane described above.

BRIEF DESCRIPTION OF THE DRAWINGS

Exemplary embodiments of the disclosure are described with reference to the following drawing wherein.

Some standard electrotechnical symbols are listed in the figures.

These symbols for resistors, coils/impedances, transistors and other systems known from circuit technology are generally known and the person skilled in the art will understand the operation of the system according to the disclosure from these symbols alone. The disclosure is not limited to the specific elements. To the extent that the same function can also be achieved with a different sequence of electronic components, the latter may be used in the same way.

DESCRIPTION

In the following, only the most important points of the disclosure are described. Nevertheless, the relevant skilled person understands how to read the corresponding schematic figures and thus recognizes the function of the data exchange or power flow in the corresponding units. Where it makes sense from an electrotechnical point of view, parts of the corresponding example can also be omitted.

Figure 1:
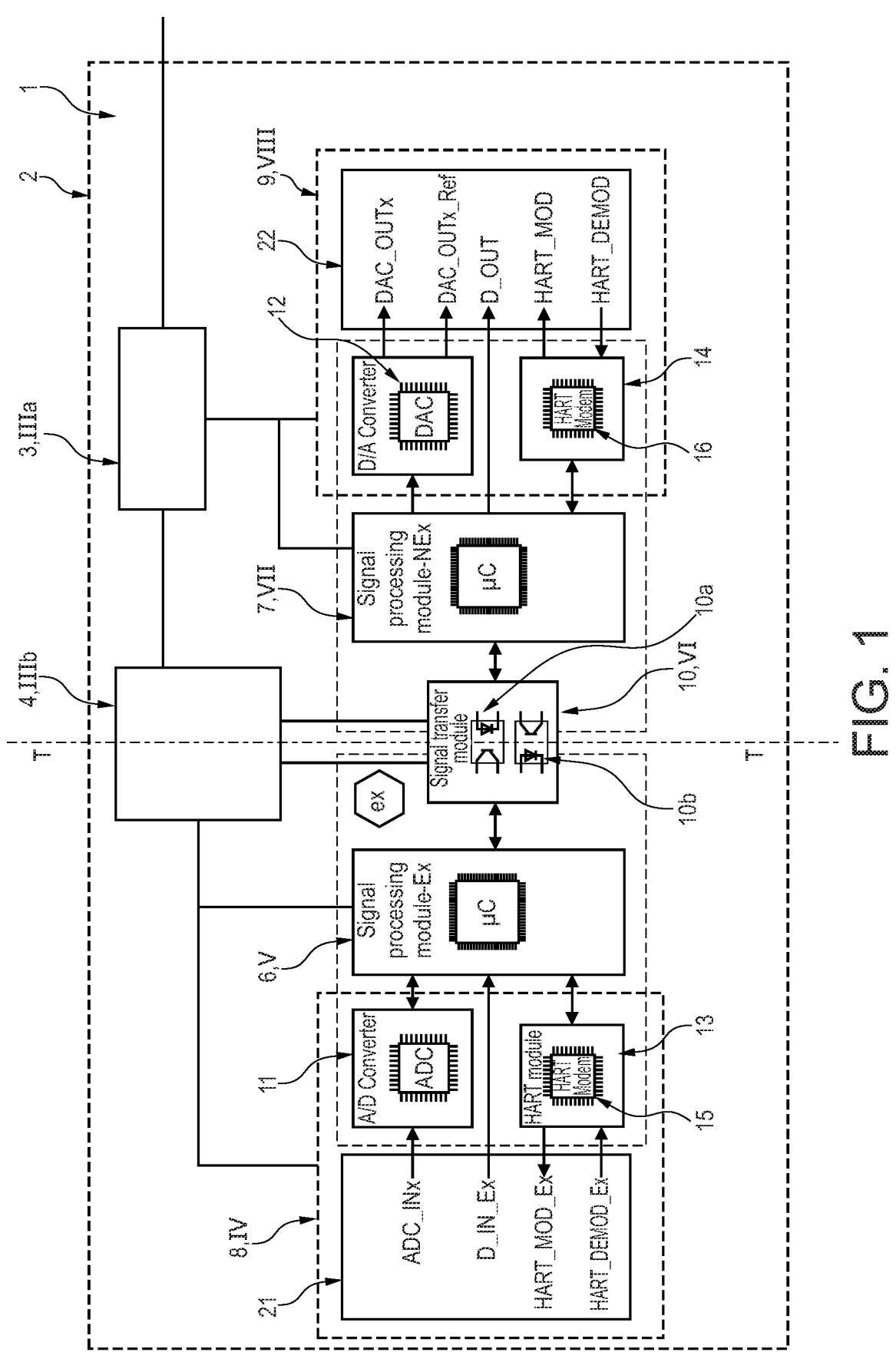
FIG. 1 shows a schematic representation of an example signal transmission system according to the disclosure.

The system shown in FIG. 1 is, for example, a signal transmission unit 1 that has a housing 2. A backplane, which is not shown, is provided in the housing 2. Various modules may be provided on this backplane. Reference label 3 indicates a power supply module, reference label 4 indicates a power transfer module, reference label 10 indicates an optocoupler module, reference label 6 indicates a first signal processing module, reference label 7 indicates a second signal processing module, reference label 8 indicates a first transformation module, and reference label 9 indicates a second transformation module.

Voltage is supplied to the corresponding further modules through the power supply module 3. The voltage is supplied via the power transfer module 4, which is described in more detail with reference to FIG. 3, across the galvanic isolation T to the corresponding further modules, in this case a first signal processing module 6, a first transformation module 8, a second signal processing module 7 and a second transformation module 9.

On the side shown in FIG. 1 on the left, the first transformation module 8 and the first signal processing module 6 are shown. Mirrored to this on the galvanic isolation T (see schematic dashed line), which runs through the optocoupler module 10, the second transformation module 9 and the second signal processing module 7 are provided.

In the optocoupler module 10, the data signals described further below are transmitted.

FIG. 1 shows the structure of the system in a generalized and rather schematic way. It is not to be understood as an exact circuit diagram.

With reference label 10, an optocoupler arrangement is provided. The elements of the optocoupler arrangement 10 need not be provided in a common module, even though this may be the case in a specific example. Schematically, two optocouplers, denoted 10a and 10b, are shown within the optocoupler arrangement 10.

There is also used the common electronic symbol for an optocoupler, which represents transmitter and receiver units.

The optocoupler described with reference label 10a has a light emitting diode on the right side shown in FIG. 1 and a photosensor on the left side, so that the data are transmitted here from right to left, for example. A reversed structure is provided in the optocoupler designated by reference label 10b: There, a light emitting diode is shown on the left side and a photosensor on the right side, so that data transfer takes place from left to right there.

The left side shown in FIG. 1 corresponds to the side of the signal transmission system assigned to a field device, in particular in a hazardous area, while the right side corresponds to the side of the signal transmission system facing a superordinate unit, in particular outside the hazardous area.

The first and second signal processing modules are designated by reference labels 6 and 7, respectively. There, a microcomputer is schematically designated with μC.

Although a modular design is described here, a different signal processing arrangement can also be provided as long as it allows the appropriate signal processing steps.

In the signal processing modules, the corresponding signals from the optocouplers 10a, 10b are converted back into the corresponding signals, which are then transmittable on the output side via the corresponding DA/AD converters or the HART modules to the field device not shown or to the superordinate unit.

On the side facing the field device an A/D converter is shown with reference label 11 and on the side facing the superordinate unit a D/A converter is shown with reference label 12. Via the A/D converter 11, an analog signal coming from the field device, which for example contains the main process variable, is convertable into a digital signal. This digital signal is then converted in the first signal processing module 6 into a signal that is transmittable in the optocoupler arrangement 10. From the optocoupler arrangement 10, this is then transmitted to the second signal processing module 7, where it is converted back into a corresponding digital signal, which is then convertable back into the analog signal containing the main process variable in the D/A converter 12, which is then in turn transmittable to the superordinate unit.

Thus, an exchange of the main process variables can take place via the corresponding D/A and A/D converters 11, 12.

In this example, arrows labeled D_IN_Ex and D_OUT are additionally shown to illustrate that additionally or alternatively the main process variables can be input or output in digital form ("D" stands for "Digital" in this context). In this case, the data of the main process variables are not routed via the corresponding converter, but are directly converted to data in the corresponding signal processing modules there, so that they are transmittable in the optocoupler arrangement 10.

The designations ADC_INx respectively DAC_OUTx/DAC_OUTx_Ref describe the analog input and output signals of the main process variables.

The arrows with the designation "HART" indicate the exchange of the HART signal, which is used here for the transmission of further data (communication data), wherein HART_MOD_Ex and HART_DEMOD_ex are respectively the modulated and demodulated HART signal on the field device side and HART_MOD and HART_DEMOD are respectively the modulated and demodulated HART signal on the superordinate unit side.

In the present example, only a data transmission in the direction from a field device not shown to the superordinate unit is shown. Thus, only a flow of the main process variables is shown in the upper part of FIG. 1, which leads from the field device to the superordinate unit. A corresponding design can also be selected so that the flow back from the superordinate unit can also be routed via the signal transmission system to the field device.

In the lower part of FIG. 1, the flow of the data part described in the claims as so-called "further data" is shown schematically. This is an example where the further data are transmitted in the so-called HART format.

In the corresponding first HART module 13 and second HART module 14, a corresponding first HART modem 15 and second HART modem 16, respectively, is provided. There, the corresponding HART data part is tapped from the signal from the field device (on the left side in FIG. 1) or from the superordinate unit on the right side in FIG. 1. This signal is converted in the corresponding HART module into a TTL signal and transferred to the corresponding signal processing modules 6, 7 and then transmitted via its corresponding optocoupler.

The HART data part can be overlaid by the analog part, where the main process variables are carried, as previously described for the prior art, and can thus be tapped in the HART module.

The step of transmission by means of the optocoupler arrangement implements galvanic isolation.

In particular, an FSK signal (frequency-shift keying) is tapped by means of capacitors and converted into TTL signals via a HART modem. These are transmitted to a microcontroller and from the HART modem via an optocoupler for galvanic isolation to a second microcontroller, which converts the data packets back into TTL level and via a further HART modem on the other side of the galvanic isolation again via two capacitors on a shunt resistor to a current loop as FSK signal.

To avoid data collisions, the microprocessors are equippable with appropriate interlock logic and this logic is also transmittable via the optocouplers.

By splitting the data stream into suitable packets, bidirectional communication is possible between the superordinate unit (HART master) to the field device (HART slave) and vice versa.

In the second step, pure HART communication is also transmittable via the same optocouplers as the measurement data.

The corresponding details of the example in FIG. 1 are shown in the further FIGS. 2A to 7.

Figure 2A:
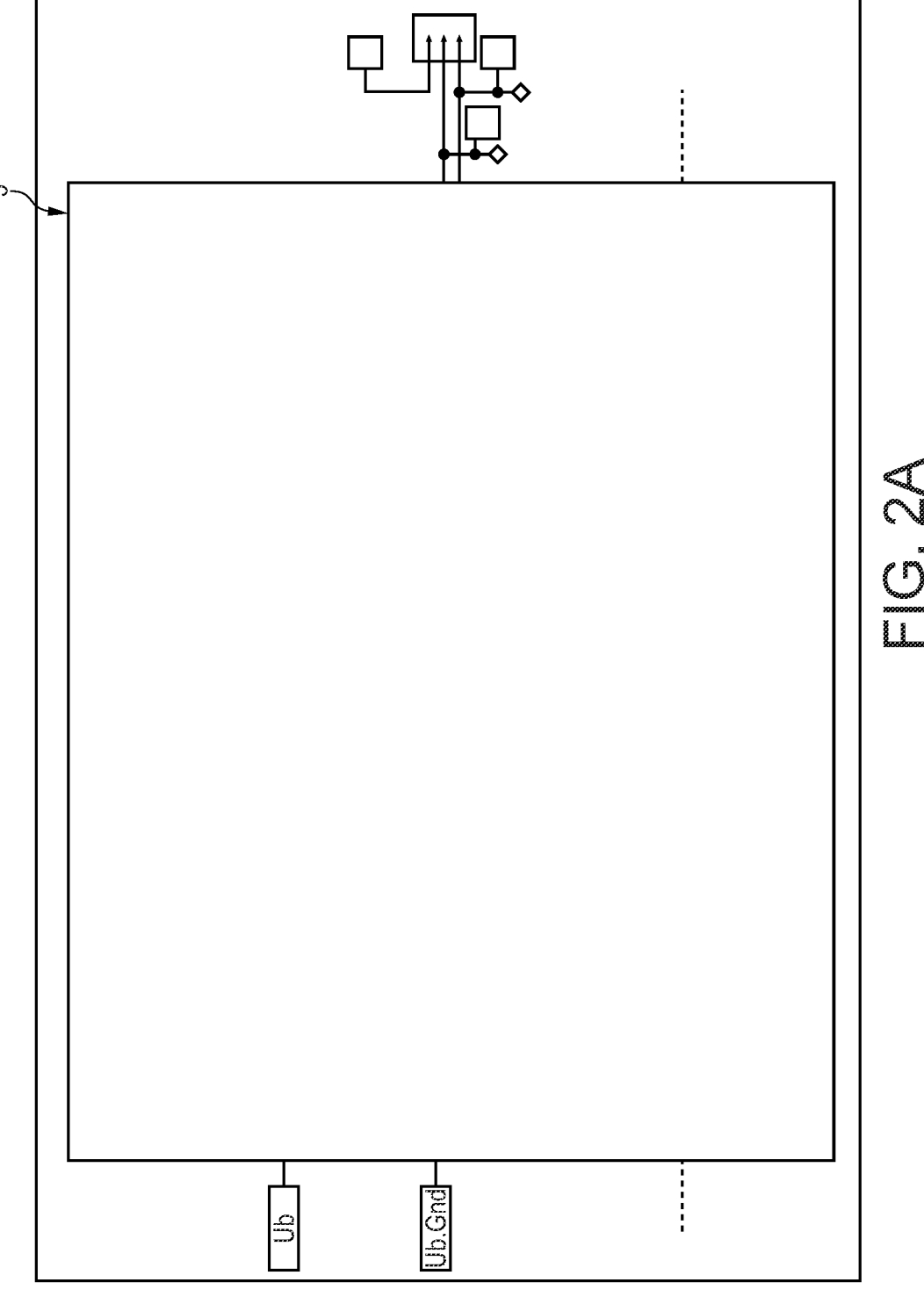
FIG. 2A shows the part of the example system marked Ma in FIG. 1.

FIG. 2A schematically shows the power supply module 3 at the corresponding connections UB and UB,Gnd. On the left side in FIG. 2A, the corresponding voltage is transferred to the power transfer module 4 shown in FIG. 2B. The corresponding connections UB and UB,Gnd are shown on the right side at the top of FIG. 2B.

An input section is provided there with a coil arrangement 18 comprising a coil 18a, 18b, 18c and 18a', 18b', 18c'.

From the coil 18a, the power is transferred to the corresponding coils 18b, 18c. From coil 18a', power is transferred to the corresponding coils 18b' and 18c'. Coils 18b and 18b' provide transfer to a 3-volt system. The coils 18c and 18c' ensure transmission to a 24-volt system.

Figure 2B:
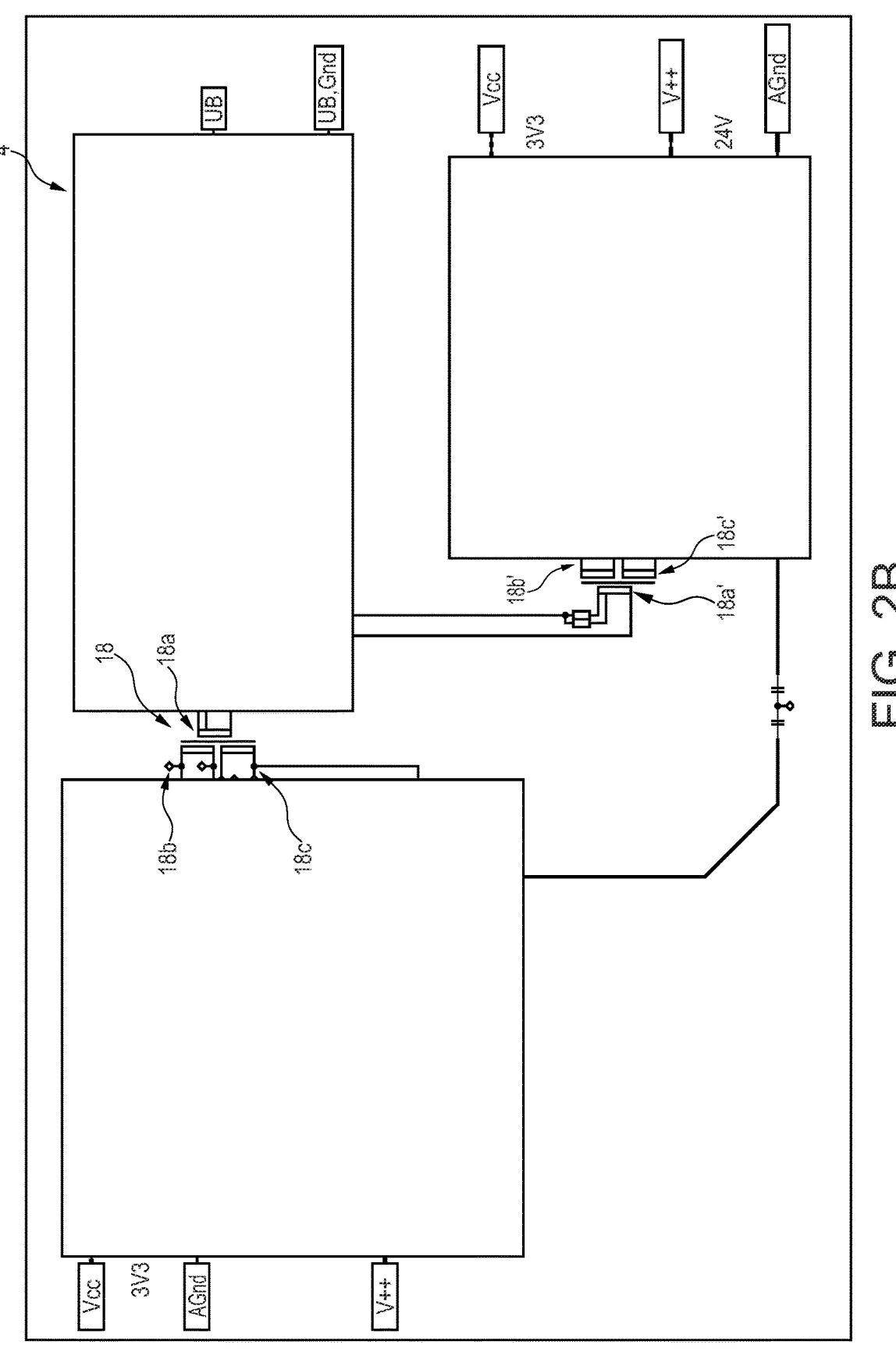
FIG. 2B shows the part of the example system marked Mb in FIG. 1.

The 24-volt system is always characterized by the V++ symbol on the tap (see FIG. 2B, left side and right side). The 3-volt system is always characterized by the Vcc label on the tap (see FIG. 2B, left side and right side). The lines correspond to the supply lines to the corresponding modules in FIG. 1. There, the same are used in the corresponding connection designations.

Thus, the 3-volt and 24-volt systems are connected to each of the modules (first signal processing module, second signal processing module, first transformation module, second transformation module). Only the 3-volt system is connected to the optocoupler module.

The transmission of signals between the corresponding modules is also shown schematically in FIG. 1. The arrows indicate the direction.

Figure 3:
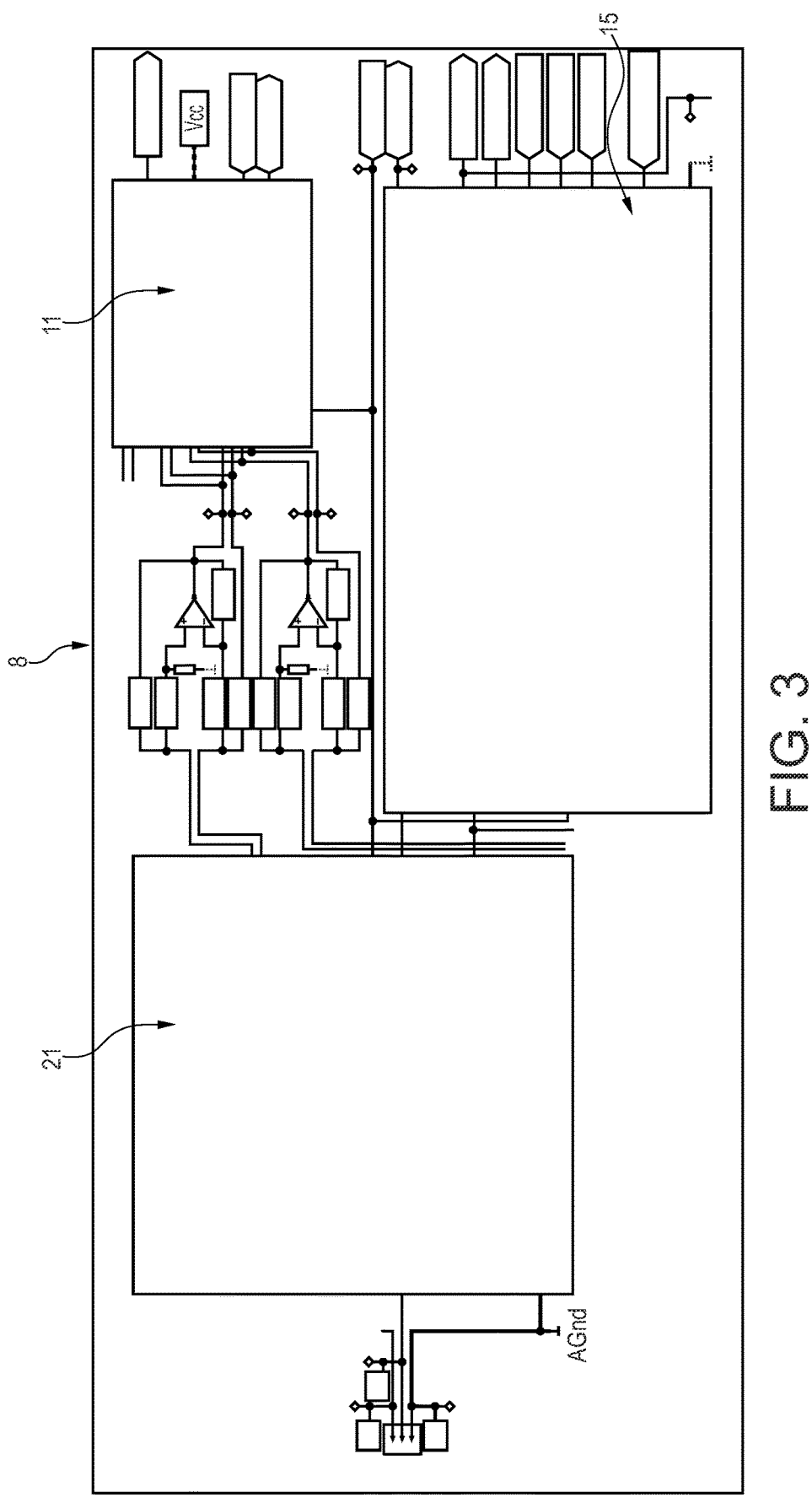
FIG. 3 shows the part of the example system marked IV in FIG. 1.

FIG. 3 shows the part of the first transformation module 8 in FIG. 1 on the left side. In FIG. 3 on the left side the corresponding inputs from a field device are shown. In FIG. 3 the first HART modem 15 is delimited with the line around the corresponding electronic elements (see right side FIG. 3).

In the first HART modem 15, the corresponding HART data part in HART format is converted into a TTL format and then transmitted to the signal processing module 6 (cf. FIG.

4). A so-called HART portion separation arrangement is provided, which is configured to separate the HART portion of the data from the field device input signal. The HART portion is then fed to the HART modem and converted into TTL to be fed to the corresponding signal processing module.

Furthermore, an A/D converter 11 is provided.

FIG. 1 also shows the direction of signal flow between the signal processing modules and the transformation modules, with the corresponding arrows indicating the direction.

Figure 4:
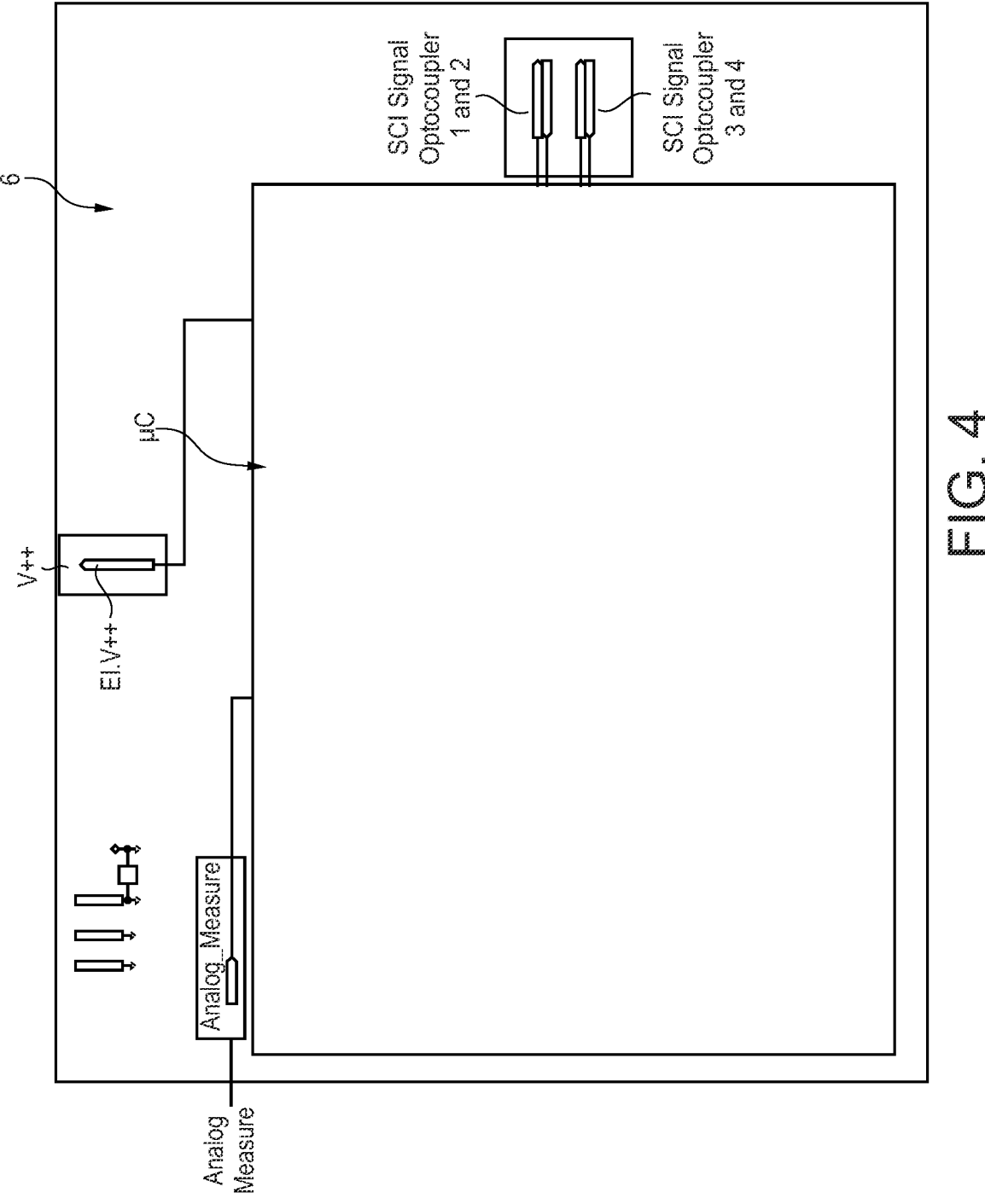
FIG. 4 shows the part of the system marked V in FIG. 1.

Signal processing then takes place in the first signal processing module 6 shown in FIG. 4, and these converted signals are fed to the corresponding optocouplers.

Figure 5:
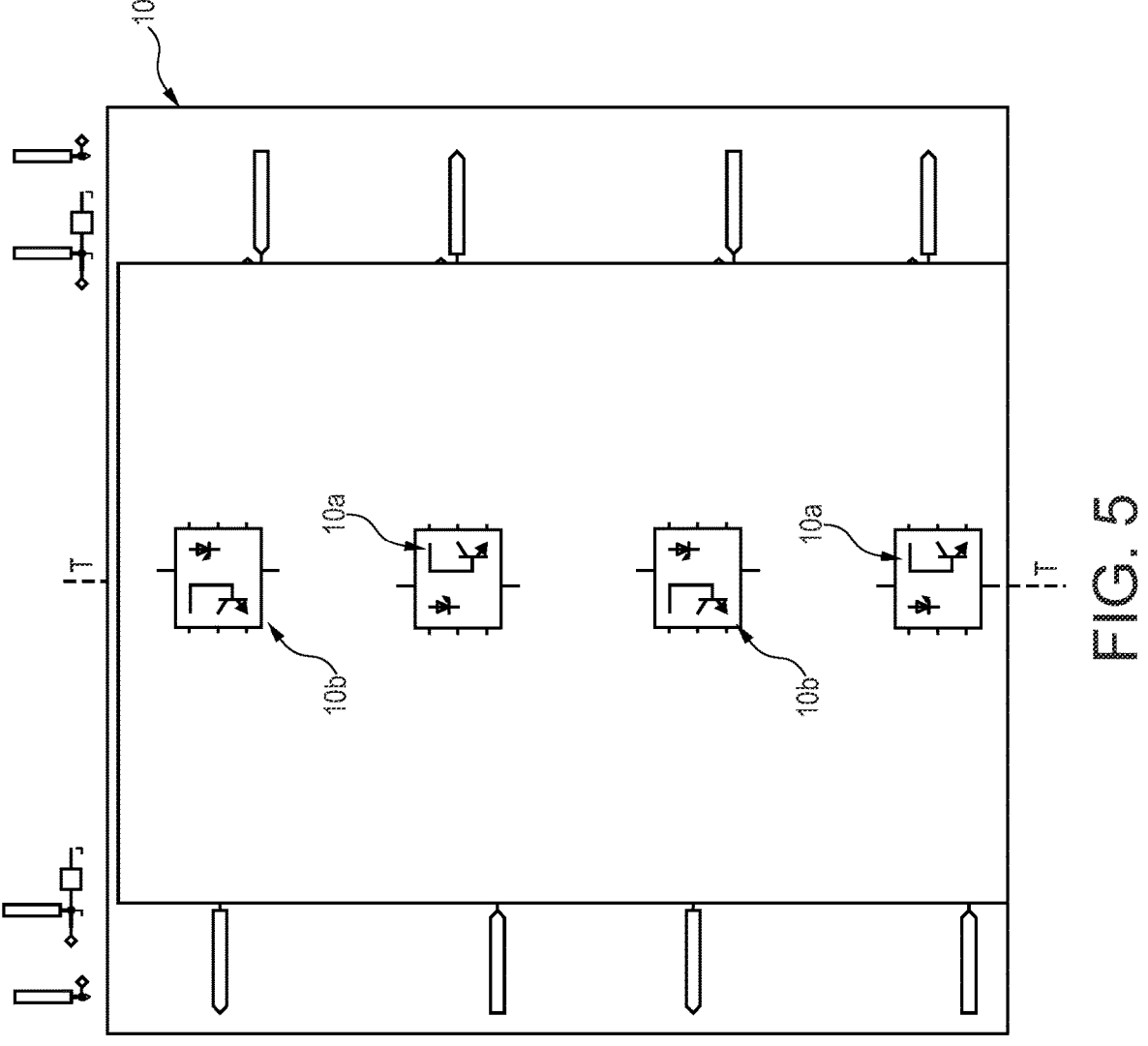
FIG. 5 shows the part of the system marked VI in FIG. 1.

Four optocouplers are provided (see FIG. 5). The optocouplers, which correspond to the second and fourth optocouplers counted from top to bottom in the sequence, are connected in one direction so that the signals are transmitted from the field device to the superordinate unit. The first and third optocouplers, seen from the top, are connected in one direction so that the signals are transmitted from the superordinate unit to the field device.

In FIG. 4, the input, at which the corresponding analog signals arrive and are then converted into digital signals, is also shown at the top left with the designation Analog Measure.

By means of the first and second optocouplers 10b, 10a counted from top to bottom in FIG. 5, the corresponding digitized signals associated with the main process variable are transmitted. By means of the third and fourth optocouplers 10b, 10a counted from top to bottom in FIG. 5, the corresponding further data containing the HART signal are transmitted.

Essentially, electrical isolation is ensured by means of the line shown in FIG. 5 (reference label T).

For this purpose, at least the modules shown in FIG. 1 are provided in mirror symmetry.

Figure 6:
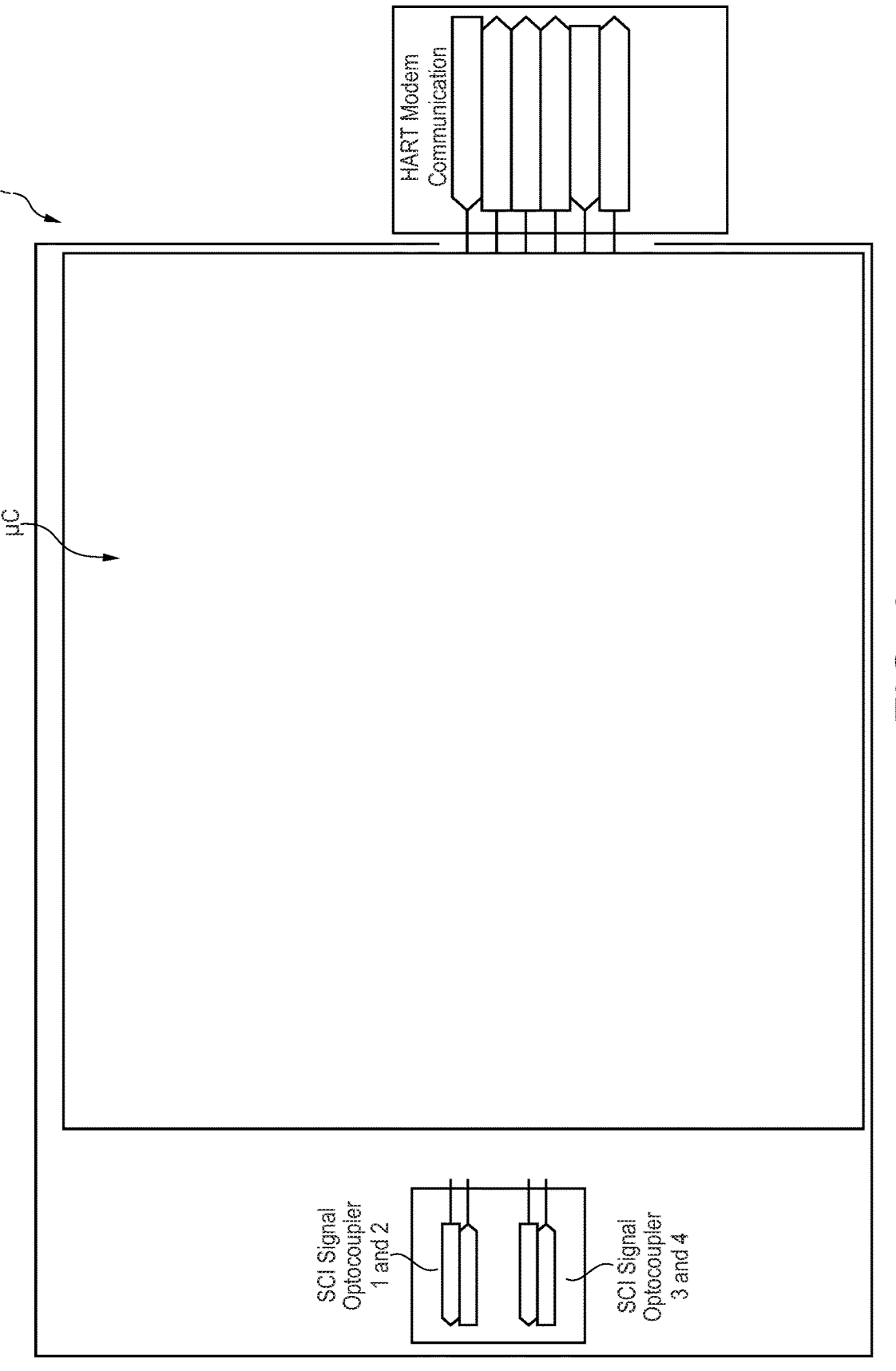
FIG. 6 shows the part of the system marked VII in FIG. 1.
Figure 7:
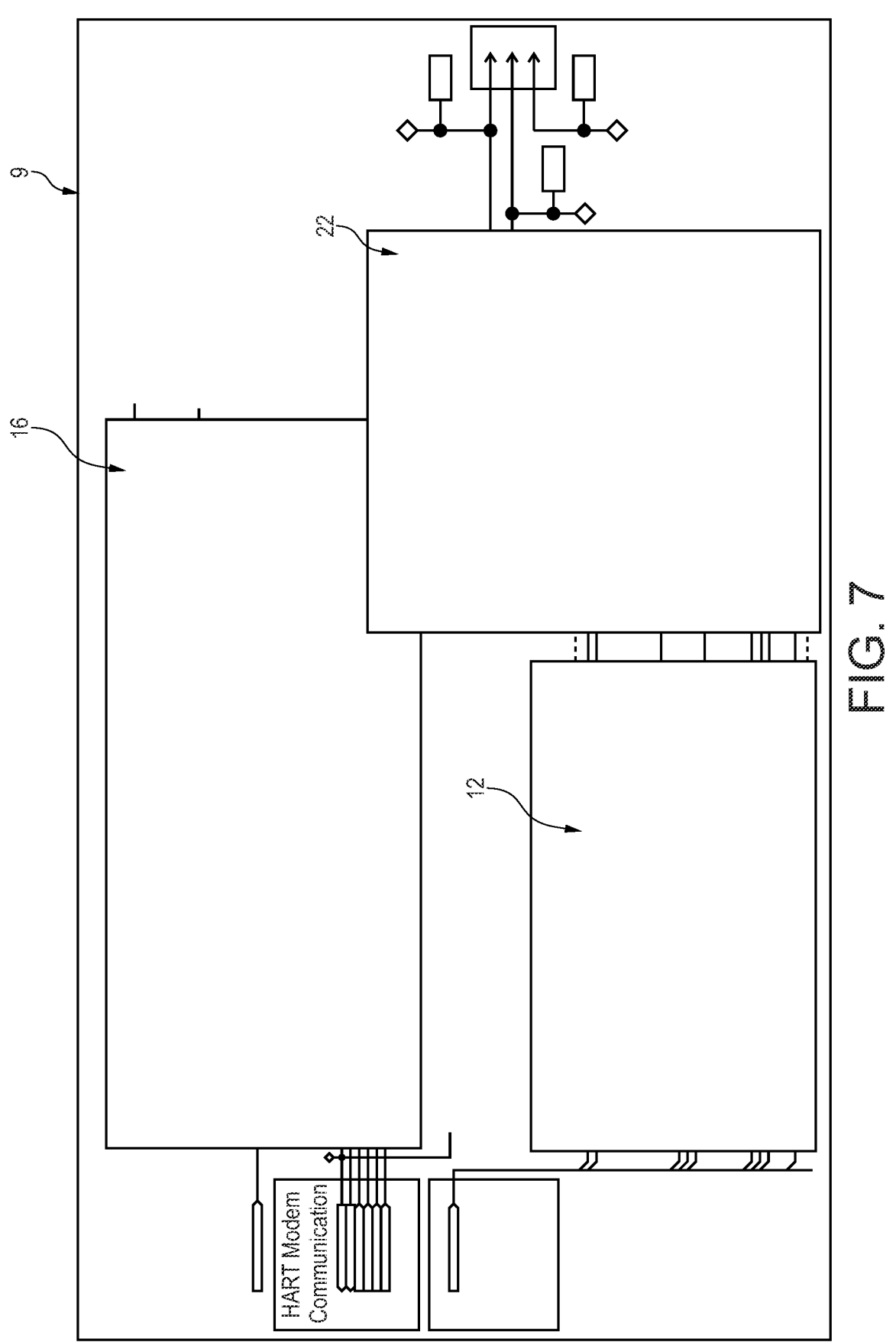
FIG. 7 shows the part of the system marked VIII in FIG. 1.

Accordingly, as shown in FIG. 6, from the corresponding optocouplers the signal is fed back into the second signal processing module 7 and from there it is then fed back to the second transformation module 9, which is shown in FIG. 7.

Furthermore, a D/A converter 12 is provided in FIG. 7.

From there, the corresponding signals are then sent back to the superordinate unit.

This particular example shows one way in which such a signal transmission system can be designed, but the disclosure is not limited to this particular system, but can be implemented in all examples as they are explained in the general description.

LIST OF REFERENCE LABELS

1 signal transmission unit
2 housing
3 power supply module
4 power transfer module
6 first signal processing module
7 second signal processing module
8 first transformation module
9 second transformation module
10 optocoupler arrangement
10a, 10b optocoupler
11 A/D converter
12 D/A converter
13 first HART module
14 second HART module
15 first HART modem
16 second HART modem

18, 18a, 18a', 18b, 18b', 18c, 18c' coil arrangement of the power transfer module
21 Converter (Input)
22 Converter (Output)
T electronic separation

The invention claimed is:

1. A signal transmission system for transmitting a main process variable and further data between a field device and a superordinate unit, the system comprising:
    a first conversion arrangement;
    a second conversion arrangement; and
    an optocoupler arrangement connected between the first conversion arrangement and the second conversion arrangement,
    wherein the first conversion arrangement is configured to convert at least the further data exchanged between the field device and the superordinate unit into a data signal such that they are transmittable via the optocoupler arrangement, wherein the optocoupler arrangement is configured to transmit the data signal between the first conversion arrangement and the second conversion arrangement,
    wherein the second conversion arrangement is configured to convert the data signal to the further data exchanged between the field device and the superordinate unit and to transmit the further data to the field device, and
wherein:
    the first conversion arrangement comprises a first HART modem which is configured to receive from the field device a field device input signal comprising the main process variables and the further data in the HART standard, and to filter out a HART data part from the field device input signal and to pass the HART data part as a data signal via the optocoupler arrangement to the second conversion arrangement,
    wherein the second conversion arrangement comprises a second HART modem configured to convert the data signal again to the further data in the HART standard, and
    wherein the second HART modem is configured to output the HART data part filtered out by the first HART modem after its conversion to the further data in the HART standard as a superordinate unit output signal which is output by the signal transmission system to the superordinate unit; and/or
wherein:
    the second conversion arrangement comprises a second HART modem which is configured to receive from the superordinate unit a superordinate unit input signal comprising the main process variables and further data in the HART standard, and to filter out the HART data part and to pass the HART data part as a data signal via the optocoupler arrangement to the first conversion arrangement, wherein the first conversion arrangement comprises the first HART modem, which is configured to convert the data signal to the further data in the HART standard, and
    wherein the first HART modem is configured to output the HART data part filtered out by the second HART modem after its conversion to the further data in the HART standard as a field device output signal.

2. The signal transmission system according to claim 1, wherein the further data comprise field device input data sent from the superordinate unit to the field device and/or comprises field device output data transmitted from the field device to the superordinate unit.

3. The signal transmission system according to claim 1, wherein the further data are transmitted in a HART (Highway Addressable Remote Transducer) standard.

4. The signal transmission system according to claim 1, wherein:

each of the respective conversion arrangements comprises at least one signal processing unit which is provided between the first or the second HART modem via which the HART data part is passed on to the optocoupler arrangement, and wherein optionally the first and second HART modems are each configured to convert the HART data part into a (Transistor-to-Transitor Logic) TTL signal, which is converted by the respective signal processing unit to have a format that is transmittable via the optocoupler arrangement.

5. The signal transmission system according to claim 1, wherein the first HART modem taps the HART data part from the field device input signal received coming from the field device via a first capacitor arrangement and/or outputs the HART data part via a first capacitor arrangement to form the field device output signal; and/or wherein the second HART modem taps the HART data part of the superordinate unit input signal received coming from the superordinate unit via a second capacitor arrangement and/or outputs the HART data part via the second capacitor arrangement to form the superordinate unit output signal.

6. The signal transmission system according to claim 1, wherein:

the main process variables are transmitted by an analog signal between the field device and the superordinate unit, wherein the first conversion arrangement comprises an A/D converter configured to convert the analog signal into a digital main process variable signal used within the signal transmission system, and wherein the second conversion arrangement comprises a D/A converter configured to convert the digital main process variable signal used within the signal transmission system again to an analog signal, wherein optionally the A/D converter is provided in parallel with the first HART modem, and the main digital process variable signal of the A/D converter and the HART data part of the first HART modem are transmitted between the A/D converter or the first HART modem and the signal processing unit of the first conversion arrangement, wherein the digital main process variable signal processed by the signal processing unit of the first conversion arrangement and the HART data part are transmitted between the signal processing unit of the first conversion arrangement and the optocoupler arrangement, and/or wherein optionally the D/A converter is provided in parallel with the second HART modem, and the digital main process variable signal of the D/A converter and the HART data part of the second HART modem are transmitted between the D/A converter or the second HART modem and the signal processing unit of the second conversion arrangement, wherein the digital main process variable signal and HART data part processed by the signal processing unit of the second conversion arrangement are transmitted between the signal processing unit of the second conversion arrangement and the optocoupler arrangement.

7. The signal transmission system according to claim 6, wherein the optocoupler arrangement comprises at least one HART data part transmission optocoupler for transmitting the processed HART data part and/or one main process variable transmission optocoupler for transmitting the processed digital main process variable signal.

8. The signal transmission system according to claim 1, wherein the optocoupler arrangement comprises, for each transmission direction between the field device and the superordinate unit, a separate optocoupler.

9. A signal transmission system according to claim 6, wherein the signal transmission system is configured such that the processed HART data part and the processed digital main process variable signal are transmittable via a single optocoupler.

10. The signal transmission system according to claim 1, wherein:

the main process variable is transmitted between the field device and the signal transmission system in digital form, and/or the main process variable is transmitted between the superordinate unit and the signal transmission system in digital form.

11. The signal transmission system according to claim 1, wherein one or more of following elements a, b, c is/are designed as an independent module, respectively, which is pluggable into a backplane of a signal transmission unit via a plug connection:

a) first conversion arrangement, b) optocoupler arrangement, and c) second conversion arrangement; and optionally additionally wherein the respective first and/or second conversion arrangement comprises for itself a signal processing unit module and a transformation module for transformation and/or splitting of the main process variables and the further data.

12. The signal transmission system according to claim 1, wherein the first conversion arrangement and second conversion arrangement are galvanically isolated from each other, and/or wherein the first conversion arrangement and second conversion arrangement are supplied with power via a common power supply device.

13. The signal transmission system according to claim 1, wherein the signal transmission system includes same types of electrical elements in a same arrangement on both sides of a galvanic isolation device, and/or the signal transmission system is configured for intrinsically safe operation.

14. A method for transmitting a main process variable and further data between a field device and a superordinate unit, the method comprising:

transmitting at least the further data between the field device and the superordinate unit via an optocoupler arrangement of a signal transmission system, the system comprising:

a first conversion arrangement;

a second conversion arrangement; and the optocoupler arrangement connected between the first conversion arrangement and the second conversion arrangement, wherein the first conversion arrangement is configured to convert at least the further data exchanged between the field device and the superordinate unit into a data signal such that they are transmittable via the optocoupler arrangement, wherein the optocoupler arrangement is configured to transmit the data signal between the first conversion arrangement and the second conversion arrangement, wherein the second conversion arrangement is configured to convert the data signal to the further data exchanged between the field device and the super-ordinate unit and to transmit the further data to the field device, and wherein:

the first conversion arrangement comprises a first HART modem which is configured to receive from the field device a field device input signal comprising the main process variables and the further data in the HART standard, and to filter out a HART data part from the field device input signal and to pass the HART data part as a data signal via the optocoupler arrangement to the second conversion arrangement, wherein the second conversion arrangement comprises a second HART modem configured to convert the data signal again to the further data in the HART standard, and wherein the second HART modem is configured to output the HART data part filtered out by the first HART modem after its conversion to the further data in the HART standard as a superordinate unit output signal which is output by the signal transmission system to the superordinate unit; and/or wherein:

the second conversion arrangement comprises a second HART modem which is configured to receive from the superordinate unit a superordinate unit input signal comprising the main process variables and further data in the HART standard, and to filter out the HART data part and to pass the HART data part as a data signal via the optocoupler arrangement to the first conversion arrangement, wherein the first conversion arrangement comprises the first HART modem, which is configured to convert the data signal to the further data in the HART standard, and wherein the first HART modem is configured to output the HART data part filtered out by the second HART modem after its conversion to the further data in the HART standard as a field device output signal.

* * * * *